United States Patent
Matmour et al.

(10) Patent No.: US 9,487,614 B2
(45) Date of Patent: Nov. 8, 2016

(54) PROCESS FOR RADICAL GRAFTING OF A DIENE ELASTOMER

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Rachid Matmour, Clermont-Ferrand (FR); Robert Ngo, Clermont-Ferrand (FR); Nicolas Seeboth, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(*) Notice: Subject to any disclaimer, the term of this patent is extended or adjusted under 35 U.S.C. 154(b) by 0 days.

(21) Appl. No.: 14/653,337

(22) PCT Filed: Dec. 17, 2013

(86) PCT No.: PCT/EP2013/076979
§ 371 (c)(1),
(2) Date: Jun. 18, 2015

(87) PCT Pub. No.: WO2014/095925
PCT Pub. Date: Jun. 26, 2014

(65) Prior Publication Data
US 2015/0299367 A1    Oct. 22, 2015

(30) Foreign Application Priority Data
Dec. 20, 2012 (FR) .................... 12 62470

(51) Int. Cl.
C08C 19/20 (2006.01)
C08F 279/02 (2006.01)

(52) U.S. Cl.
CPC ............. *C08F 279/02* (2013.01); *C08C 19/20* (2013.01)

(58) Field of Classification Search
None
See application file for complete search history.

(56) References Cited

U.S. PATENT DOCUMENTS

| 2009/0156751 A1* | 6/2009 | Kwag ............ C08C 19/20 525/332.4 |
| 2010/0190894 A1 | 7/2010 | Chaverot et al. |
| 2012/0059094 A1 | 3/2012 | Chaverot et al. |
| 2013/0131229 A1 | 5/2013 | Harders et al. |

FOREIGN PATENT DOCUMENTS

FR    2962440 A1    1/2012

OTHER PUBLICATIONS

International Search Report for PCT/EP2013/076979 dated Apr. 2, 2014.
Ameduri Bruno et al: "Synthesis and properties of fluorinated telechelic macromolecular diols prepared by radical grafting of fluorinated thiols onto hydroxyl-terminated polybutadienes", Journal of Polymer Science Part A: Polymer Chemistry, John Wiley & Sons, Inc., US; Engineering Information, Inc., New Yourk, NY, US vol. 31, No. 8 Jul. 1, 1993 (Jul. 1, 1993), pp. 2069-2080, XP002712178, ISSN: 0887-624X, DOI: Retrieved from the Internet: URL:http://onlinelibrary.wiley.com/doi/10.1002/pola.1993.080310813/pdf.

* cited by examiner

*Primary Examiner* — Robert C Boyle
(74) *Attorney, Agent, or Firm* — Dickinson Wright PLLC

(57) ABSTRACT

A process for the radical grafting of a graft to a diene elastomer, comprising the following stages:
a. dissolving, with stirring, at least one diene elastomer and at least one thiol derivative as graft in a solvent comprising a mixture of at least one polar solvent and at least one nonpolar solvent,
b. heating the homogeneous reaction mixture obtained in the preceding stage to the temperature of the grafting reaction, and
c. once the temperature of the grafting reaction has been reached, adding the radical initiator in order to bring about the grafting of the graft to the units of the elastomer comprising unsaturations.

This radical grafting process makes it possible to achieve high grafting yields which can reach 100%.

16 Claims, No Drawings

PROCESS FOR RADICAL GRAFTING OF A DIENE ELASTOMER

This application is a 371 national phase entry of PCT/EP2013/076979, filed 17 Dec. 2013, which claims benefit of French Patent Application No. 1262470, filed 20 Dec. 2012, the entire contents of which are incorporated herein by reference for all purposes.

BACKGROUND

1. Field

The present disclosure relates to a process for the preparation of the diene elastomer functional along the chain which consists of a radical grafting reaction of functional groups on the unsaturations of the diene polymer in the presence of a radical initiator.

2. Description of Related Art

Various strategies are possible in order to modify the properties of the synthetic elastomers present in rubber compositions for tyres. One of the methods employed among these is the introduction of novel chemical functional groups at the end of or along the polymer chain.

The Applicant Companies are interested more particularly in the context of the invention in the functionalization along the diene polymer chain. Various types of reactions on the unsaturations of diene polymers which make possible the functionalization are known in the literature. Mention may be made of [4+2] cycloaddition reactions of Diels-Alder reaction type between a dienophile (for example maleic anhydride) and diene copolymers having conjugated dienes along the chain by virtue of the insertion of a conjugated triene comonomer (allo-ocimene) during the anionic copolymerization (EP 2 423 239 A1).

1,3-Dipolar cycloaddition reactions in the presence of nitrile oxide or nitrone (R. Huisgen, Angew. Chem. Int. Ed., 1963, 2, 565-632; R. Huisgen, Angew. Chem. Int. Ed., 1963, 2, 633-645; J. J. Tufariello, in 1,3-Dipolar Cycloaddition Chemistry, edited by Padwa, A., Wiley—Interscience, New York, 1984, Chapter 9, p. 83; K. B. G. Torssell, Nitrile Oxides, Nitrones, and Nitronates, VCH Publishers Inc., New York, 1988; K. V. Gothelf and K. V. Jorgensen, Chem. Rev., 1988, 98, 863-909) are also known for the functionalization (WO2012007441A1, WO2006045088A2) or the crosslinking of diene polymers (FR 1 583 406, WO2006081415A2).

The radical grafting of functional or nonfunctional thiol via photochemical or chemical catalyses (with or without radical initiator) forms part of these reactions for the functionalization of diene polymers (natural and synthetic rubber) in the same way as the cycloaddition reactions mentioned above (Angew. Chem. Int. Ed., 2010, 49, 1540-1573; J. Polym. Sci.: Part A: Polym. Chem., 2004, 42, 5301-5338; Polym. Chem., 2010, 1, 17-36).

European Patent Application EP 1 000 971 A1, filed by Bayer, presents the postpolymerization radical grafting of a carboxylmercaptan, such as 3-mercaptopropionic acid, to an SBR copolymer based on conjugated diene units on vinylaromatic units in the presence of a radical initiator, such as lauroyl peroxide. This chemical modification reaction, carried out in cyclohexane at 80° C. for 5 hours, leads to a grafting yield of 42%.

In the continuation of these studies, Patent Applications WO2009034001A1 and WO2009138349A1 describe a grafting process which consists in polymerizing butadiene by the anionic route and in adding, at the end of polymerization, 3-mercaptopropionic acid in the presence of lauroyl peroxide to the living polybutadiene chains before neutralization. The grafting yields obtained are approximately 70%, whether for an SBR having a high vinyl content (80%) or for an SBR having a low vinyl content (22%).

Applications WO200930840 and WO200930841 describe grafted polymers obtained from the reaction between copolymers based on conjugated diene units and on monovinylaromatic hydrocarbon units and thiol derivatives. The grafting reaction takes place in a reactor, under an inert nitrogen atmosphere, in the presence of a solvent, such as toluene, at a temperature of 90° C., with stirring, for a period of time of 3 to 4 hours, in the presence of a polymer, of a thiol derivative, which acts as graft, and of a radical initiator, such as azobisisobutyronitrile (AIBN). The grafting yields obtained under these reaction conditions are 39%.

In the continuation of these studies, Patent FR 2 962 440 A1 describes the grafting reaction between the diene polymer and a thiol derivative, in particular a paraffinic thiol derivative, in the absence of solvent and in the absence of any external radical initiator. The grafting yield obtained under these conditions is 71%.

The group of Prof. Boutevin describes the grafting of fluorinated thiols to hydroxyl telechelic polybutadiene oligomers (HTPB comprising 20% or 80% of 1,2-PB) at reflux of THF in the presence of AIBN or tert-butyl peroxypivalate (J. Polym. Sci., Part A: Polym. Chem., 1993, 31, 2069-2080). The authors demonstrated that, despite the presence of a large excess of thiol ([RSH]/[total double bond] initial molar ratio=4), the grafting yield is limited to 50%, in particular with regard to an HTPB having a low content of 1,2-PB. Nevertheless, the authors indicate the possibility of consuming the residual thiol by carrying out a second addition of peroxide after a time "t".

In the light of the above, it appears that none of the radical grafting processes described makes it possible to obtain a quantitative grafting yield (100%). This disadvantage requires that the polymer be purified (precipitation from an alcohol, removal under vacuum or by steam distillation), as indicated in the various examples of the abovementioned patents, in order to prevent the presence of an ungrafted free entity. In particular, the use of a functional thiol molecule with a high boiling point or of thiol-terminated oligomer/polymer type would make it difficult to purify the polymer in the case of a nonquantitative yield.

SUMMARY

The disadvantage of a low grafting yield, in particular in the case of a postpolymerization grafting process, has in particular been demonstrated by the Applicant Companies during various control tests in which various functional thiols are grafted to a PB or SBR having a high vinyl content in a nonpolar or polar solvent. In particular, it has been confirmed by the Applicant Companies that by adding a second amount of radical initiator during the reaction to a matrix of PB of high molecular weight (Mn=100 000 g/mol) having a high vinyl content (75%) in the presence of a functional or nonfunctional thiol does not make it possible to increase the grafting yield. It has also been demonstrated by the Applicant Companies that the radical grafting at the end of the polymerization before neutralization of the thiol, such as diethyl 12-mercaptododecylphosphonate, for example, does not make it possible to obtain an improved grafting yield, in comparison with a postpolymerization process.

The technical problem which is posed is thus of providing a process for the synthesis of (co)polymers which are functional along the chain which makes it possible to obtain a high, indeed even quantitative, radical grafting yield, which process can be adapted to a great variety of functional thiols, making it possible in particular to overcome the abovementioned disadvantages.

The present invention, in its embodiments, proposes to solve this technical problem. This is because the Inventors have demonstrated a synthesis process which makes possible the radical grafting of various thiols to elastomers which can achieve high, indeed even quantitative, yields. This makes it possible to be rid of the disadvantages encountered with the methods of synthesis envisaged above. In addition, the Inventors have discovered that the use of a nonpolar reaction solvent as a blend with a polar solvent makes it possible to obtain an improved grafting yield in comparison with the abovementioned processes, indeed even a quantitative grafting yield.

In the present description, molar percentage or content of a unit in a polymer is defined as the number of moles of this unit in the polymer with respect to the number of moles of all the units present in the said polymer. Furthermore, content or percentage by weight of a unit in a polymer is defined as the total weight of these units in the polymer with respect to the total weight of the polymer.

Furthermore, any range of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The grafting yield defines the amount of grafted thiol derivative with respect to the amount of thiol introduced.

A subject-matter of the invention is a process for the radical grafting of a graft to a diene elastomer, comprising the following stages:

a. dissolving, with stirring, at least one diene elastomer and at least one thiol derivative as graft in a solvent composed of a mixture of at least one polar solvent and of at least one nonpolar solvent, b. heating the homogeneous reaction mixture obtained in the preceding c. once the temperature of the grafting reaction has been reached, adding the radical initiator in order to bring about the grafting of the graft to the units of the elastomer comprising unsaturations.

The radical grafting process according to an embodiment of the invention can be carried out continuously or batchwise. A person skilled in the art will understand that, as a function of its implementation, the stages of the process, in particular stages a), b) and c), then take place simultaneously or successively.

DETAILED DESCRIPTION OF SPECIFIC EMBODIMENTS

The radical grafting process according to an embodiment of the invention comprises a first stage of dissolution with stirring, preferably mechanical stirring, of at least one diene elastomer and at least one thiol derivative as graft in a solvent composed of a mixture of at least one polar solvent and of at least one nonpolar solvent.

The process according to an embodiment of the invention employs at least one thiol derivative as graft. This thiol derivative may or may not be functional. Functional is understood to mean the possibility for the thiol derivative of comprising a functional group generally comprising a heteroatom, such as, for example, oxygen, nitrogen, sulphur, phosphorus or silicon.

According to an alternative form of the invention, the thiol derivative is chosen from the compounds of following formula (1):

$HS-R^1-X$        Formula 1 in which:

$R^1$ denotes a $C_1$-$C_{36}$ alkyl, $C_5$-$C_{15}$ cycloalkyl, $C_6$-$C_{15}$ aryl or $C_7$-$C_{15}$ arylalkyl group, it being possible for these groups to be halogenated or nonhalogenated, X denotes a $C_1$-$C_{50}$ alkyl, $C_5$-$C_{50}$ cycloalkyl, $C_6$-$C_{50}$ aryl or $C_7$-$C_{50}$ arylalkyl group, a hydrocarbon group comprising at least one heteroatom chosen from O, N, P, S and Si, or a halogen atom, or also a monovalent polymer chain.

When X denotes an alkyl group, it is preferably a methyl radical.

When X denotes an aryl or arylalkyl group, it is preferably a benzyl, phenyl, tolyl or xylyl radical.

When X denotes a hydrocarbon group comprising at least one heteroatom, it is preferably a group having a hydroxyl, ketone, carboxylic acid, carboxylic acid ester, ether, primary, secondary or tertiary amine, amide, nitrile, silane, alkylsilane or alkoxysilane functional group.

When X denotes a halogen atom, it is preferably a fluorine, chlorine, bromine or iodine atom.

Mention may be made, among these thiol derivative used as grafts in the context of the invention, of thiols, such as 2-mercaptoethanol, dodecanethiol, 4-cyanobutanethiol, cysteamine, mercapto-1-decanoic acid, 4-mercaptobutyric acid, ethyl thioglycolate, 3-chloro-1-propanethiol, methyl 3-mercaptopropionate, benzyl mercaptan, 3-dimethylamino-1-propanethiol, 3-methoxy-1-propanethiol, 2-(2-oxiranylmethoxy)ethanethiol, and the like.

When X denotes a monovalent polymer chain, it denotes, according to one alternative form, a polymer obtained from olefinic monomers. Mention may be made, as olefinic monomers, as non-exclusive examples, of monoolefin monomers, such as ethylene, propylene, 1-butene, isobutylene, pentene, methylpentene, 1-hexene, and the like, conjugated diene monomers, such as described below, fluorinated diene monomers, vinyl monomers, such as vinylaromatics (styrene derivatives as defined above and also vinylpyridines, vinyl-N—($C_1$-$C_6$ alkyl)pyrroles, vinyloxazoles, vinylthiazoles, vinylpyrimidines, vinylimidazoles, and the like), $C_1$-$C_{20}$ alcohol (meth)acrylates (acrylic acid, acrylamide, methyl acrylate, ethyl acrylate, butyl acrylate, hexyl acrylate, 2-ethylhexyl acrylate, methacrylic acid, methacrylamide, methyl methacrylate, ethyl methacrylate, butyl methacrylate, hexyl methacrylate, 2-ethylhexyl methacrylate), (meth)acrylonitrile, $C_1$-$C_6$ alcohol cyanoacrylates, vinyl ketones (vinyl methyl ketone, and the like), vinyl phenyl ketone, vinyl acetate, vinyl acetals, vinyl ethers (vinyl methyl ether, vinyl ethyl ether, vinyl isobutyl ether, and the like), vinyl alcohols, vinyl halides (vinyl chloride, vinylidene chloride, tetrafluoroethylene, vinyl fluoride, vinylidene fluoride, ethylene tetrafluoroethylene, perfluoroalkoxy, and the like), silicon-comprising monomers, such as silanes, siloxanes (dimethylsiloxane, methylhydroxysiloxane, diphenylsiloxane, and the like), carbosilanes, and the like, oxiranes, such as ethylene oxide, propylene oxide, and the like, cyclic esters, such as lactones, lactides, and the like, phosphorus-comprising monomers (polyphosphazene), sulphur-comprising monomers (thiazyl, sulphur nitride, and the like) or boron-comprising monomers (borazylenes). The polymerization of such monomers is known per se. A person skilled in the art will know how to adjust the polymerization technique as a function of the type of monomer to be polymerized.

When X denotes a monovalent polymer chain, it denotes, according to other alternative forms, a polymer obtained by polycondensation, such as polyesters, polycarbonates, polyanhydrides, polyamines, polyimines, polyamides, polyimides, polyurethanes, polyureas, polysulphones, polyethersulphones, polyarylenealkylenes, and the like.

One implementation of the process of the invention consists in using a mixture of thiol derivatives as defined above as grafts of the diene elastomer.

The process according to an embodiment of the invention employs at least one diene elastomer. Diene elastomer should be understood as meaning, according to the invention, an elastomer exhibiting, among other unsaturations, unsaturations of vinyl origin resulting at least in part (i.e., a homopolymer or a copolymer) from diene monomers (monomers bearing two conjugated or nonconjugated carbon-carbon double bonds). Unsaturations of vinyl origin refer to pendant unsaturations of the elastomer chain originating from an insertion of vinyl type of the diene monomer into the elastomer.

Diene elastomers can be classified into two categories: "essentially unsaturated" or "essentially saturated". "Essentially unsaturated" is generally understood to mean a diene elastomer resulting at least in part from conjugated diene monomers having a content of units of diene origin (conjugated dienes) which is greater than 15% (% by weight). It is with this category of "essentially unsaturated" elastomers which the process according to the invention is concerned. In the category of "essentially unsaturated" diene elastomers, "highly unsaturated" diene elastomer is understood in particular to mean a diene elastomer having a content of units of diene origin (conjugated dienes) which is greater than 50%.

Given these definitions, diene elastomer capable of being used in an embodiment of the invention is understood more particularly to mean:

(a) any homopolymer obtained by polymerization of a conjugated diene monomer having from 4 to 12 carbon atoms, such as, for example, 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene;

(b) any copolymer obtained by copolymerization of one or more of the abovementioned conjugated dienes, with one another or with one or more ethylenically unsaturated monomers.

Mention may be made, as ethylenically unsaturated monomers, of:

vinylaromatic compounds having from 8 to 20 carbon atoms, such as, for example, styrene, ortho-, meta- or para-methylstyrene, the vinylmesitylene commercial mixture, divinylbenzene or vinylnaphthalene;

vinyl nitrile monomers having from 3 to 12 carbon atoms, such as, for example, acrylonitrile or methacrylonitrile;

acrylic ester monomers derived from acrylic acid or methacrylic acid with alcohols having from 1 to 12 carbon atoms, such as, for example, methyl acrylate, ethyl acrylate, propyl acrylate, n-butyl acrylate, isobutyl acrylate, 2-ethylhexyl acrylate, methyl methacrylate, ethyl methacrylate, n-butyl methacrylate or isobutyl methacrylate;

the copolymers can comprise between 99% and 20% by weight of diene units and between 1% and 80% by weight of vinylaromatic, vinyl nitrile and/or acrylic ester units.

(c) a ternary copolymer obtained by copolymerization of ethylene and of an α-olefin having from 3 to 6 carbon atoms with a nonconjugated diene monomer having from 6 to 12 carbon atoms, such as, for example, the elastomers obtained from ethylene and propylene with a nonconjugated diene monomer of the abovementioned type, such as in particular 1,4-hexadiene, ethylidenenorbornene or dicyclopentadiene; such polymers are described in particular in the documents WO 2004/035639A1 and US 2005/0239639A1;

(d) a copolymer of isobutene and isoprene (butyl rubber), and also the halogenated versions, in particular chlorinated or brominated versions, of this type of copolymer;

(e) natural rubber;

(f) a mixture of several of the elastomers defined in (a) to (e) with one another.

The polymers which can be used according to an embodiment of the invention can be obtained according to conventional polymerization techniques well known to a person skilled in the art. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion, in emulsion or in solution; they can be coupled and/or star-branched or also functionalized with a coupling and/or star-branching or functionalization agent.

Mention may be made, among the elastomers used in the context of the grafting process according to an embodiment of the invention, as nonexclusive examples, of polybutadiene, polyisoprene, polychloroprene and their hydrogenated versions, polyisobutylene, block copolymers of butadiene and isoprene with styrene, and also their hydrogenated versions, such as poly(styrene-b-butadiene) (SB), poly(styrene-b-butadiene-b-styrene) (SBS), poly(styrene-b-isoprene-b-styrene) (SIS), poly(styrene-b-(isoprene-stat-butadiene)-b-styrene) or poly(styrene-b-isoprene-b-butadiene-b-styrene) (SIBS), hydrogenated SBS (SEBS), poly(styrene-b-butadiene-b-methyl methacrylate) (SBM), and also its hydrogenated version (SEBM), random copolymers of butadiene with styrene (SBR) and acrylonitrile (NBR) and their hydrogenated versions, random copolymers of isoprene with styrene (SIR) and their hydrogenated versions, random copolymers of isoprene and butadiene with styrene (SBIR) and their hydrogenated versions, butyl or halogenated rubbers, ethylene/propylene/diene (EPDM) copolymers, and also their mixtures.

The diene elastomer or elastomers used in an embodiment of the invention are advantageously chosen from the elastomers exhibiting a content by weight of vinyl units (for example units of 1,2-type) in the diene part of greater than 20%, preferably of at least 40% and more preferably still of at least 50%.

Among these, the diene elastomer or elastomers used in an embodiment of the invention are very particularly selected from the group of the highly unsaturated diene elastomers consisting of polybutadienes (abbreviated to "BRs"), synthetic polyisoprenes (IRs), natural rubber (NR), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs) and isoprene/butadiene/styrene copolymers (SBIRs).

The molar ratio of the amounts of grafts to the vinyl units resulting from the conjugated diene(s) is at least 0.1%, preferably 0.2% and more preferably still 0.3%, and it is at most 80%, preferably 60% and more preferably still 40%.

The process according to an embodiment of the invention employs the dissolution of at least one elastomer and of at least one graft in a solvent composed of a mixture comprising at least one polar solvent and at least one nonpolar solvent.

This dissolution can be carried out according to any implementation available to a person skilled in the art. According to one implementation, the elastomer is dissolved in the nonpolar solvent and is mixed with stirring with the graft dissolved in the polar solvent. Or, conversely, the graft in solution in the polar solvent is mixed with the elastomer in solution in the nonpolar solvent with stirring.

The solvent according to the invention is composed of a mixture comprising at least one polar solvent and at least one nonpolar solvent. Preferably, the polar solvent and the nonpolar solvent are miscible.

Use may be made, as polar solvent, of any polar solvent, such as a nitrogenous compound of amine or nitrogenous heterocycle type, a ketone, a sulphoxide, an ether, a halogenated solvent of chloroform, dichloromethane, dichloroethane, tetrachloroethane, and the like, type, and also their mixtures. Preferably, dichloromethane or THF is used.

Use may be made, as nonpolar solvent, according to the process in accordance with the invention, of any inert hydrocarbon solvent which can, for example, be an aliphatic or alicyclic hydrocarbon, such as pentane, hexane, heptane, isooctane, cyclohexane or methylcyclohexane, or an aromatic hydrocarbon, such as benzene, toluene or xylene, and also their mixtures. Preferably, methylcyclohexane or toluene is used.

The process according to an embodiment of the invention comprises the stage of heating the homogeneous reaction mixture obtained in the preceding stage to the temperature of the grafting reaction. The grafting reaction temperature is at least 20° C. and at most 120° C.; preferably, it varies from 50° C. to 100° C. and more preferably still from 60° C. to 90° C.

The process according to an embodiment of the invention comprises, once the temperature of the grafting reaction has been reached, the stage of addition of a radical initiator in order to bring about the grafting of the graft to the units of the elastomer comprising unsaturations. Use may be made, according to an embodiment of the invention, as radical initiator, of any initiator known to a person skilled in the art. Mention may be made, for example, of azobisisobutyronitrile or also peroxides, it being known that, as the nature of the peroxide has no impact on the grafting yield, all peroxides can be envisaged. The radical initiator can be added to the reaction mixture in any normal form; however, preferably in the form of a solution in a solvent. Preferably, the solvent of the radical initiator is identical to one at least of the polar and nonpolar solvents used to respectively dissolve the graft and the diene elastomer. Mention may thus be made, as such a solvent, of methylcyclohexane, tetrahydrofuran, dichloromethane, and the like.

Preferably, the molar ratio of graft to the radical initiator is at least 12, preferably 24, and at most 96, preferably 48.

The solvent of the reaction medium according to an embodiment of the invention, namely the mixture of the polar and nonpolar solvents, including the solvent of the radical initiator, advantageously comprises at most 60% by volume of polar solvent with respect to the volume of nonpolar solvent. Below this value, the grafting yield makes it possible to significantly reduce the disadvantages related to the presence of unreacted thiols. For example, the amount of polar solvent can be between 0% and 60% by volume with respect to the total volume of nonpolar solvent. In addition, the amount of polar solvent with respect to the mixture of solvents is preferably at most 40% by volume with respect to the total volume of nonpolar solvent, below which value the quantitative yield can be expected. According to another preferred aspect of the invention which can be combined with the preceding aspects, the solvent comprises at least 4% by volume of polar solvent with respect to the total volume of nonpolar solvent. For example, the amount of polar solvent can vary from 4% to 60% by volume with respect to the total volume of nonpolar solvent, preferably from 4% to 40% by volume.

Preferably, the amount of total solvent or of solvent of the reaction medium is such that the concentration by weight of elastomer is between 1% and 40% by weight, preferably between 2% and 20% and more preferably still between 2% and 10% in the said solvent.

It should be noted that, in the context of the invention, the preferred aspects and alternative forms described above can be combined with one another.

Contrary to what has been described in the prior art, the reaction between the elastomer and the graft which are described above takes place in the presence of a mixture of solvents and of a radical initiator to form a grafted polymer.

According to an embodiment of the invention, the radical grafting process thus defined makes it possible to achieve significantly high grafting yields varying from 30% to 100%, indeed even, according to specific implementations, yields varying from 70% to 100%, indeed even from 80% to 100%. It should be noted that, unexpectedly, the process according to an embodiment of the invention makes it possible to produce quantitative radical graftings of diene elastomers, namely with a grafting yield of 100%.

On conclusion of the grafting of stage c), the reaction is halted in a conventional way known to a person skilled in the art, for example by addition, to the grafted elastomer obtained, of an antioxidant, such as 4,4'-methylenebis(2,6-di(tert-butyl)phenol). This antioxidant can be added in the form of a solution in an organic solvent, such as toluene or methylcyclohexane, which is subsequently evaporated.

The radical grafting process according to an embodiment of the invention makes it possible to prepare grafted elastomers which exhibit a lower polydispersity index than elastomers grafted in a nonpolar solvent. The distribution of the molecular weights is narrower as there are fewer chain cleavages and/or chain branches with an improved grafting yield with respect to the grafted polymers obtained according to the processes described in the prior art, which in particular employ a system based on just one nonpolar solvent, such as hexane, cyclohexane, and the like.

The grafted elastomers according to the process of an embodiment of the invention can be used as is or as mixtures of one or more other compounds. The presence of grafted groups along the chain makes it possible to envisage a use in similar applications of the modified diene polymers. For example, it is known, for the optimization of the interactions between the elastomer and the reinforcing filler within a reinforced rubber composition, to modify the nature of the diene polymers in order to introduce functional groups therein. Thus, the specific structure of the grafted elastomer according to the invention makes it possible to envisage its use in the manufacture of various products based on reinforced rubber as a function of the nature of the grafted thiol derivative.

The abovementioned characteristics of the present invention, and also others, will be better understood on reading the following description of several examples of the implementation of the invention, given by way of illustration and without implied limitation.

Example of the Implementation of the Invention

Measurements Used

The elastomers are characterized, before curing, as indicated below.

Size Exclusion Chromatography

Size Exclusion Chromatography or SEC is used. SEC makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the distribution of the molar masses of a polymer. The different number-average molar masses (Mn) and weight-average molar masses (Mw) can be determined from commercial standards and the polydispersity index (PI=Mw/Mn) can be calculated via a "Moore" calibration.

Preparation of the polymer: There is no specific treatment of the polymer sample before analysis. The polymer sample is simply dissolved, in tetrahydrofuran+1 vol % distilled water, at a concentration of approximately 1 g/l. The solution is then filtered through a filter with a porosity of 0.45 µm before injection.

SEC analysis: The apparatus used is a Waters Alliance chromatograph. The elution solvent is tetrahydrofuran. The flow rate is 0.7 ml/min, the temperature of the system is 35° C. and the analytical time is 90 min. A set of four Waters columns in series, having the trade names Styragel HMW7, Styragel HMW6E and (two) Styragel HT6E, is used.

The injected volume of the solution of the polymer sample is 100 µl. The detector is a Waters 2410 differential refractometer and the software for making use of the chromatographic data is the Waters Empower system.

The calculated average molar masses are relative to a calibration curve produced from PSS Ready Cal-Kit commercial polystyrene standards.

Glass Transition Temperature

The glass transition temperatures Tg of the polymers are measured by means of a differential calorimeter (differential scanning calorimeter). The analysis is carried out according to the requirements of Standard ASTM D3418-08.

Nuclear Magnetic Resonance Spectroscopy

The contents of the various monomer units and their microstructures within the copolymer are determined by an NMR analysis. The spectra are acquired on a 500 MHz Bruker spectrometer equipped with a 5 mm BBIz-grade "broad band" probe. The quantitative $^1$H NMR experiment uses a simple 30° pulse sequence and a repetition time of 3 seconds between each acquisition. The samples are dissolved in carbon disulphide ($CS_2$). 100 µl of deuterated cyclohexane ($C_6D_{12}$) are added for the lock signal.

The $^1$H NMR spectrum makes it possible to quantify the grafted units by integration of the following characteristic signals:

| Grafted thiol | Protons integrated | Chemical shift (δ) (ppm) |
|---|---|---|
| 4-Cyano-butanethiol | | 2.5 (NC—$CH_2$—) 2.6 (—S—$CH_2$—) |
| Dodecanethiol | | 0.75 (—$CH_2$—$CH_3$) 2.25 (—S—$CH_2$—) |
| 2-Mercapto-ethanol | | 3.9 (—S—$CH_2$—) |

Examples of the Implementation of the Invention

Starting Elastomer Used

Butadiene homopolymer prepared in solution, exhibiting the following microstructural characteristics by $^1$H NMR:

content by weight of 1,2-(vinyl) units: 75%

This polybutadiene exhibits a molecular weight Mn=118 300 g/mol and a PI=1.07 and a Tg of −31° C. (with ΔT=7).

Treatment Applied to the Starting Elastomer:

The starting polymer is subjected to an antioxidizing treatment by addition of 0.4 part per hundred parts of elastomers (phr) of 4,4'-methylenebis(2,6-di(tert-butyl)phenol) and of 0.4 part per hundred parts of elastomers (phr) of N-(1,3-dimethylbutyl)-N'-phenyl-p-phenylenediamine.

Synthesis of a Grafted Polymer in Methylcyclohexane (Control):

5 g of polybutadiene are dissolved in 125 ml of methylcyclohexane in a 250 ml reactor equipped with a reflux condenser and a mechanical stirrer. A solution of 1.48 g of dodecanethiol in 30 ml of methylcyclohexane is added to the polymer solution and the reaction medium is heated to 80° C. Subsequently, a solution of 61.7 mg of lauroyl peroxide in 30 ml of methylcyclohexane is injected using a syringe.

After 4 hours at 80° C., 1 ml of a 100 g/l solution of 4,4'-methylenebis(2,6-di(tert-butyl)phenol) in methylcyclohexane (i.e. 0.1 g) is added and the reaction medium is left stirring at 80° C. for 15 minutes. Once returned to ambient temperature, the reaction medium is subsequently coagulated from 400 ml of methanol and then rinsed with 200 ml of methanol. The functionalized polybutadiene is dried by stoving under vacuum (200 torr) at 60° C. for 1 day.

The content of grafted functional group determined by $^1$H NMR spectroscopy is 0.43 mol %. The grafting yield is 6%.

Synthesis of a Grafted Polymer in a Methylcyclohexane/Dichloro-Methane Solvent Blend (According to the Invention):

5 g of polybutadiene are dissolved in 125 ml of methylcyclohexane in a 250 ml reactor equipped with a reflux condenser and a mechanical stirrer. A solution of 1.44 g of dodecanethiol in 30 ml of dichloromethane is added to the polymer solution and the reaction medium is heated to 80° C. Subsequently, a solution of 61.2 mg of lauroyl peroxide in 30 ml of methylcyclohexane is injected using a syringe.

After 4 hours at 80° C., 1 ml of a 100 g/l solution of 4,4'-methylenebis(2,6-di(tert-butyl)phenol) in methylcyclohexane (i.e. 0.1 g) is added and the reaction medium is left stirring at 80° C. for 15 minutes. Once returned to ambient temperature, the reaction medium is subsequently coagulated from 400 ml of methanol and then rinsed with 200 ml of methanol. The functionalized polybutadiene is dried by stoving under vacuum (200 torr) at 60° C. for 1 day.

The fraction by volume of polar solvent is 20% with respect to the volume of nonpolar solvent.

The content of grafted functional group determined by $^1$H NMR spectroscopy is 7.5 mol %. The grafting yield is 100%.

The results of tests of radical grafting of different thiols to the diene elastomers are combined in Table I below.

It should be remembered that the grafting yield is the amount of thiol derivative grafted with respect to the amount of thiol introduced.

TABLE I

| Test | Thiol derivative | Solvent | Initiator | Reaction time (hours) | $M_n$ (kg/mol) | Molar % of grafted functional group | PI (Mw/Mn) | Grafting yield (%) |
|---|---|---|---|---|---|---|---|---|
| 1 | Dodecanethiol | MCH/CH$_2$Cl$_2$ | Lauroyl peroxide | 4 | 113 | 7.5 | 1.26 | 100 |
| 2 | Dodecanethiol | THF | AIBN | 4 | 88 | 3.7 | 1.07 | 46 |
| 3 | Dodecanethiol | MCH | Lauroyl peroxide | 4 | 108 | 0.4 | 1.66 | 5 |
| 4 | 2-Mercaptoethanol | MCH/CH$_2$Cl$_2$ | Lauroyl peroxide | 4 | 129 | 8.3 | 1.25 | 100 |
| 5 | 2-Mercaptoethanol | THF | AIBN | 4 | 115 | 3.4 | 1.13 | 44 |
| 6 | 2-Mercaptoethanol | MCH | Lauroyl peroxide | 4 | 144 | 0.3 | 1.75 | 4 |
| 7 | 4-Cyanobutanethiol | MCH/CH$_2$Cl$_2$ | Lauroyl peroxide | 4 | 116 | 7.9 | 1.5 | 100 |
| 8 | 4-Cyanobutanethiol | THF | AIBN | 4 | 110 | 3.5 | 1.2 | 45 |
| 9 | 4-Cyanobutanethiol | MCH | Lauroyl peroxide | 4 | 140 | 0.2 | 1.83 | 2.5 |

It was found that the grafting yield is higher when the process according to the invention, which employs a mixture of solvents comprising a nonpolar solvent and a polar solvent, is used, instead of the process carried out in a purely nonpolar solvent (for example methylcyclohexane) or in a purely polar solvent (for example THF) of the prior art.

It is also found that the polydispersity indices of the grafted polymers change much more when the grafted polymers are synthesized in a purely nonpolar solvent, as is the case in the prior art. The polydispersity indices of the grafted polymers synthesized according to the process according to the invention in a mixture of a nonpolar solvent and of a polar solvent and in the presence of a radical initiator are lower than those of the grafted polymers synthesized in a purely nonpolar solvent (for example methylcyclohexane).

The process according to the invention thus has the advantage of giving higher yields. Furthermore, it provides grafted polymers with lower polydispersities than those obtained for the grafted polymers synthesized in a nonpolar solvent.

The invention claimed is:

1. A process for the radical grafting of a graft to a diene elastomer, comprising the following stages:
   a) dissolving, with stirring, at least one diene elastomer and at least one thiol derivative as graft in a solvent comprising a mixture of at least at least one polar solvent and at least one nonpolar solvent,
   b) heating the homogeneous reaction mixture obtained in the preceding stage to the temperature of the grafting reaction, and
   c) once the temperature of the grafting reaction has been reached, adding the radical initiator in order to bring about the grafting of the graft to the units of the elastomer comprising unsaturations, and wherein the solvent of the mixture in stage c) comprises at least 4% by volume and at most 60% by volume of the at least one polar solvent with respect to the volume of the at least one nonpolar solvent.

2. The process for the radical grafting of a graft to a diene elastomer according to claim 1, wherein the polar solvent is selected from the group consisting of nitrogenous solvents, ketones, sulphoxides, ethers, halogenated solvents, and mixtures of these solvents.

3. The process for the radical grafting of a graft to a diene elastomer according to claim 2, wherein the polar solvent is dichloromethane or tetrahydrofuran.

4. The process for the radical grafting of a graft to a diene elastomer according to claim 1, wherein the thiol derivative is chosen from the compounds of following formula (1):

HS—R1-X            Formula (1)

wherein: R1 denotes a C1-C36 alkanediyl, C5-C15 cycloalkanediyl, C6-C15 arenediyl or C7-C15 alkanediyl group, it being possible for these groups to be halogenated or nonhalogenated, X denotes a C1-C50 alkyl, C5-C50 cycloalkyl, C6-C50 aryl or C7-C50 arylalkyl group, a halogen atom, a hydrocarbon group comprising at least one heteroatom selected from the group consisting of O, N, P, S and Si, or a monovalent polymer chain.

5. The process for the radical grafting of a graft to a diene elastomer according to claim 4, wherein the thiol derivative is selected from the group consisting of 2-mercaptoethanol, dodecanethiol, 4-cyanobutanethiol, cysteamine, mercapto-1-decanoic acid, 4-mercaptobutyric acid, ethyl thioglycolate, 3-chloro-1-propanethiol, methyl 3-mercaptopropionate, benzyl mercaptan, 3-dimethylamino-1-propanethiol, 3-methoxy-1-propanethiol, and 2-(2-oxiranylmethoxy)ethanethiol.

6. The process for the radical grafting of a graft to a diene elastomer according to claim 1, wherein the thiol derivative and the radical initiator are present in a molar ratio that is at least 12, and at most 96.

7. The process for the radical grafting of a graft to a diene elastomer according to claim 1, wherein the diene elastomer is chosen from elastomers exhibiting a content by weight of vinyl units in the diene part of greater than 20%.

8. The process for the radical grafting of a graft to a diene elastomer according to claim 1, wherein the diene elastomer is a polybutadiene (BR), a synthetic polyisoprene (IR), a natural rubber (NR), or a copolymer of butadiene and/or of isoprene.

9. The process for the radical grafting of a graft to a diene elastomer according to claim 1, wherein the amounts of grafts to the vinyl units resulting from the conjugated diene(s) of the diene elastomer are present in a molar ratio that is at least 0.1%, and is at most 80%.

10. The process for the radical grafting of a graft to a diene elastomer according to claim 1, wherein the solvent of the reaction medium in stage c) comprises at most 40% by volume of the at least one polar solvent with respect to the volume of the at least one nonpolar solvent.

11. The process for the radical grafting of a graft to a diene elastomer according to claim 6, wherein the molar ratio of the thiol derivative to the radical initiator is at least 24 and at most 48.

12. The process for the radical grafting of a graft to a diene elastomer according to claim 7, wherein the diene elastomer is chosen from elastomers exhibiting a content by weight of vinyl units in the diene part of greater than 40%.

13. The process for the radical grafting of a graft to a diene elastomer according to claim 7, wherein the diene elastomer is chosen from elastomers exhibiting a content by weight of vinyl units in the diene part of greater than 50%.

14. The process for the radical grafting of a graft to a diene elastomer according to claim 8, wherein the diene elastomer is a butadiene/styrene copolymer (SBR), an isoprene/butadiene copolymer (BIR), an isoprene/styrene copolymer (SIR), or an isoprene/butadiene/styrene copolymer (SBIR).

15. The process for the radical grafting of a graft to a diene elastomer according to claim 9, wherein the molar ratio of the amounts of grafts to the vinyl units resulting from the conjugated diene(s) of the diene elastomer is at least 0.2% and at most 60%.

16. The process for the radical grafting of a graft to a diene elastomer according to claim 9, wherein the molar ratio of the amounts of grafts to the vinyl units resulting from the conjugated diene(s) of the diene elastomer is at least 0.3% and at most 40%.

* * * * *